Inventor
Hans Sauer
by B. Singer & F. Stern
Attys

Jan. 9, 1940.                    H. SAUER                  2,186,619
                      ENLARGING AND COPYING DEVICE
                        Filed July 22, 1938        2 Sheets-Sheet 2
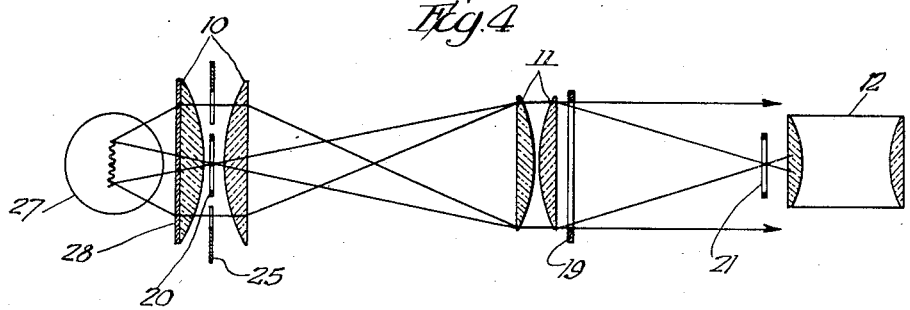
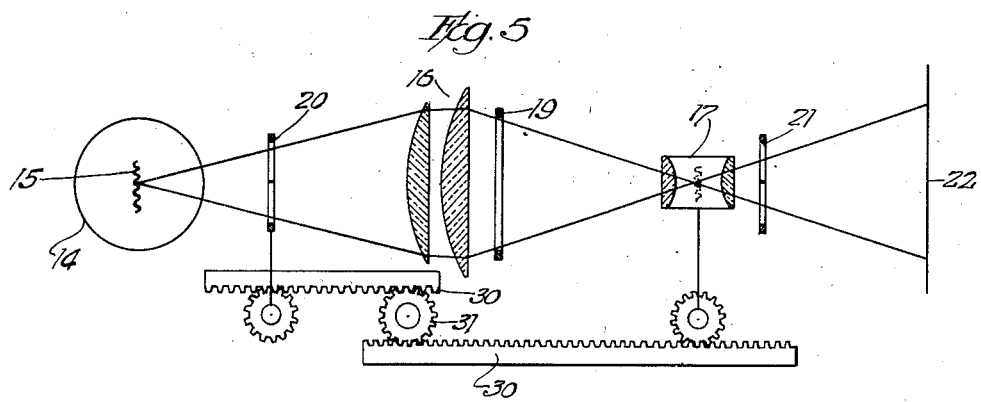
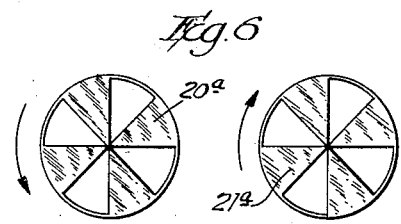
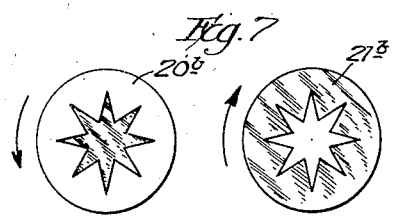
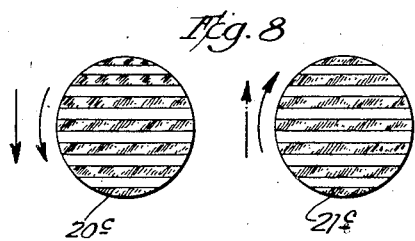
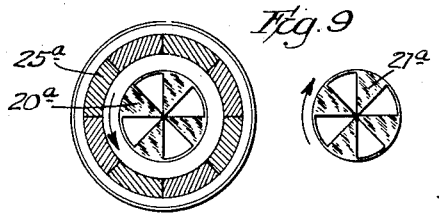
Inventor
Hans Sauer
by B. Singer & F. Stern
Attys.

Patented Jan. 9, 1940

2,186,619

UNITED STATES PATENT OFFICE 2,186,619

ENLARGING AND COPYING DEVICE

Hans Sauer, Dresden, Germany, assignor to Zeiss Ikon Aktiengesellschaft, Dresden, Germany Application July 22, 1938, Serial No. 220,803
In Germany July 30, 1937

4 Claims. (Cl. 88—24)

The invention relates to improvements in enlarging and copying devices.

At the present time principally two types of enlargers are used, namely the type which operates with so called directed light and the type which operates with diffused light. The difference between these two types consists in the following:

Enlargers employing directed light are provided with a source of light having a relatively small area. A condenser located between the source of light and the negative produces an image of the source of light approximately in the plane of the diaphragm of the enlarging objective. Enlargers employing diffused light usually maintain the negative in the opening of an Ulbricht sphere, or against an opal or frosted glass plate so that each element of the emulsion on the negative is illuminated by a beam of light whose aperture is substantially greater than the aperture at the objective of the enlarger. The employment of a greater aperture in the path of light does not by itself detrimentally influence the enlarging operation, but the light dispersing properties of the negative cause that light which strikes the negative at an oblique angle to affect the printing paper. Hence the printing paper is secondarily affected thereby, while it is primarily affected by the light coming through the enlarging objective. Owing to the superposition of this dispersed light over the light passing through the lens of the enlarger the contrasts in a negative are reproduced in weakened condition when enlargements are made by diffused light. The enlarged print will show a softer graduation of contrasts than a print produced by an enlarger in which the proportion of dispersed light is relatively negligible.

The intensity of the light dispersed by the negative depends upon the density of the various area portions of the negative. Investigations have disclosed that, starting from areas of very low densities, namely relatively transparent areas, the intensity of dispersion will increase with increasing density of the portions of the negative. This increase of dispersion gradually approaches a maximum, and then again decreases even though the density, that is the blackness of the negative, increases.

The light which passes undispersed through the negative decreases in proportions to increasing density of the negative.

When therefore a mixture of directed light and diffused light is employed the contrasts present in the negative will be reproduced on the print in altered condition influenced by the relative proportion of the two types of light. These alterations therefore vary when the relative proportions of the types of light are varied.

This effect of a greatly enlarged aperture for the source of light, inducing in the print a variation of the gradation of contrasts of the negative is well known in the art. Enlarger lamps are known which permit the relative proportions of the two types of light to be varied, for instance, by insertion of a frosted or opal glass plate between the condenser lens system and the negative. In devices employing a condenser lens system, it also had been suggested to place between a light source of a relatively large luminous surface and the condenser a diaphragm of some kind, for instance a wire screen or a gray filter or the like. Size and location of this diaphragm device were selected in such a manner that an image of this diaphragm device was produced by the condenser lens within the diaphragm aperture of the enlarging objective itself. Since obviously the lamp emitted diffused light as well as directed light, this diaphragm whose image was produced in the objective had the principal effect of cutting down the directed light so that the proportion of the diffused light in the total light passing through the enlarging objective became greater, with the result that a softer density gradation is obtained in the print.

The opposite effect, namely producing a print with strong contrasts, may be attained by positioning in front of the large luminous surface—represented for instance by an opal lamp—an iris diaphragm and adjusting the diaphragm to a relatively small stop, thereby cutting out a portion of the diffused light, while a relatively greater proportion of the directed light passes through the same.

It is also known to make use of a lamp with a relatively small luminous surface and to produce by means of a condenser lens system an image of this surface somewhere near the enlarging objective by the directed light. It is then possible to suppress by means of a suitably located diaphragm this image or the light source. On the other hand, an annular diaphragm may be used which surrounds the image of source of light, whereby the diffused light is predominately weakened. Both diaphragms may be used, one after the other, and it is then possible to produce from the same negative in one case a print by predominately directed light and in the other case a print by predominately diffused light.

It is now an object of the present invention to provide enlarging and copying devices in which the equipment consists in a known way of a source of illumination, one or more condenser lenses, a negative, and an objective for producing a print of the negative on some light sensitive copying material. The invention additionally provides means for selectively varying the ratio of the intensity of light diffused by the negative to the ratio of light passing directly through the same to the objective.

Another object of the invention is to provide selectively variable means for the purpose mentioned, comprising two or more members constructed to absorb partly or entirely the photochemically active light rays.

The present invention hence also has the object of permitting the ratio of intensity of directed light passing to the objective to the ratio of diffused light to be varied gradually or continually between a maximum and minimum for each kind of light. Thus it is possible to vary the gradation of contrasts in the print until the desired result is accurately obtained, independent of the possibilities offered by the gradation in the negative.

The devices of the prior art solely permitted an interrupted step by step variation, not a gradual continuous variation between maximum and minimum intensities of "diffused" and "directed" light, since the variation was effected by positioning different diaphragms in front of the source of light or by making a number of successive exposures, to different light for different lengths of time.

The improvements of the invention are also based on the important discovery that the intensity of dispersion depends to a great extent upon the angle of dispersion. The intensity of dispersion is especially strong when the angle of dispersion is very small. The ratio of the dispersion light to the directed light obviously will be greater when the illumination aperture is large. There is, however, a natural limit to this ratio since an increase above 180° is not possible with the ordinary negatives. The discovery that the illuminating beam has to be subdivided in this manner is of great importance. It can be reduced to practice by arranging—by way of example—a screen diaphragm composed of filters adapted to absorb the photochemically active light rays on one side of the negative and to produce an image of this diaphragm reproduced by means of the condenser lens system upon a second similar screen diaphragm arranged on the opposite side of the negative. While there will be a small loss of intensity, this arrangement has the advantage of creating a dispersion of light at a very small angle, as now the illumination aperture has to be only negligibly larger than the aperture of the enlarging objective.

Another object of the invention consists in constructing these light influencing means in the form of "process" screens, screen diaphragms, sector diaphragms or the like, arranged in pairs and adjustable relatively to each other, so that the uniformity of the illumination of the negative is hardly interfered with. In condenser lens systems, as practically used, it is not feasible to meet the theoretical requirement of producing an image of the source of illumination through every surface element of the condenser lens in one single place only of the diaphragm plane of the enlarging objective; this demand is particularly not met where the enlarger is used to produce at different times enlargements of different magnification. As a rule only an approximate axial symmetry is obtainable, and any change in the enlarging ratio is usually disregarded. Hence, whenever the image of a small luminous surface in the neighborhood of the enlarging objective is covered more or less by diaphragms, the picture appearing on the copying material can not be illuminated uniformly. This defect which is noticeable in the devices of the prior art is overcome by the present invention. For this purpose the screening effect of the diaphragm is distributed over a plurality of individual screening elements positioned in common planes, but independent from each other, or diaphragm arrangements are used which are radially symmetric, so that due to a radially symmetrical intensity the uniformity of illumination is maintained.

With these and other objects in view, the invention resides in certain novel constructions and arrangements and combinations of parts, described by way of examples in the following specification and illustrated diagrammatically in the accompanying drawings, which latter show a few embodiments of the invention.

In said drawings:

Fig. 4 illustrates diagrammatically a so called Köhler illuminating device provided with the light controlling means of the present invention.

Fig. 5 illustrates diagrammatically a modification of the illuminating arrangement shown in Fig. 1.

Fig. 6 illustrates a pair of diaphragms which may be used in the illuminating arrangement of the invention by mounting the same in conjugate planes.

Fig. 7 illustrates another pair of diaphragms which may be used.

Fig. 8 illustrates still another pair of diaphragms which may be used, and

Fig. 9 illustrates the diaphragms which may be used in the illuminating arrangements illustrated in Figs. 3 and 4.

Referring to the Figs. 1 to 5, the optical equipment includes generally a source of light, a single or double condenser lens system, and an enlarging or copying objective.

The invention is by no means limited to the illuminating devices disclosed in the Figs. 1 to 5, but others may be used together with the diaphragms of the present invention.

Figure 1:
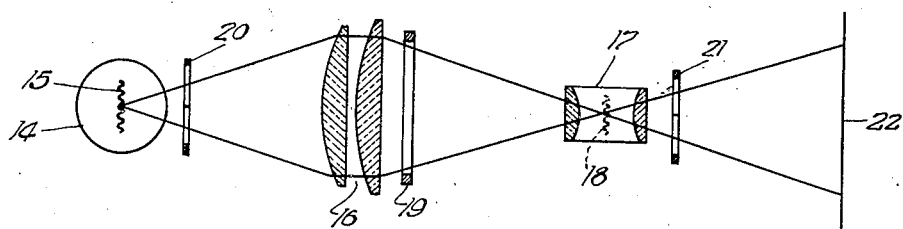
Fig. 1 illustrates diagrammatically one embodiment of an illuminating arrangement for an enlarging and copying device.

According to Fig. 1 an image of the luminous filament 15 of the clear glass lamp 14 is produced by the condenser lens system 16 in the enlarging objective 17 at 18. In front of the condenser lens system 16 is arranged the negative 19 or the picture window respectively. A diaphragm 20 is positioned in front of the clear glass lamp 14 and another diaphragm 21 is positioned in a plane conjugate to that of the diaphragm 20, namely in front of the objective 17. The copying material is indicated at 22.

Figure 2:
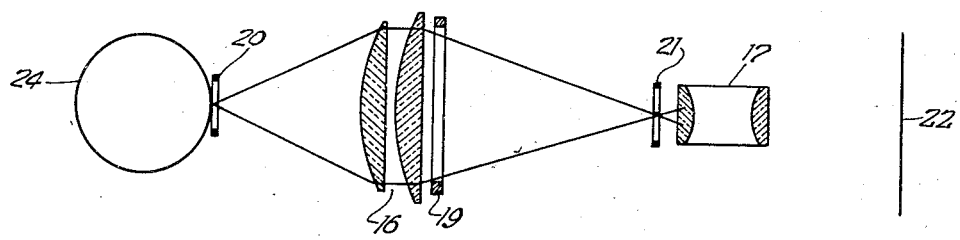
Fig. 2 illustrates diagrammatically another embodiment of the illuminating device of the invention.

In the embodiment disclosed in Fig. 2 the source of light consists of an opal glass lamp 24 or a lamp provided with a ground glass plate in front of it. The other parts of the illuminating device are the same as in Fig. 1 as indicated by the same reference characters. The first diaphragm 20 is positioned directly in front of the lamp 24 while the second diaphragm 21 is placed to the rear of the objective 17.

Figure 3:
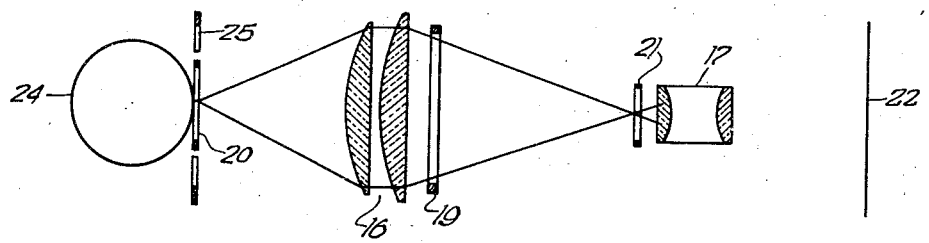
Fig. 3 illustrates diagrammatically a modification of the illuminating device shown in Fig. 2.

The device of Fig. 3 differs from Fig. 2 only in the arrangement of the additional annular diaphragm 25 placed around the central diaphragm 24 which is positioned in front of the opal glass lamp 24. The annular diaphragm 25 may be an iris diaphragm.

In the embodiment of the invention disclosed in Fig. 4, the so called Köhler system is shown. The condenser lens system 10 which is illuminated by the source of light 27 is reproduced by the condenser lens system 11 in the neighborhood of the enlarging objective 12. If the source of light 27 consists of a clear glass lamp one face 28 of the condenser lens system 10 may be frosted. A central diaphragm 20 and an annular diaphragm 25 are mounted between the two lens of the condenser lens system 10. The second diaphragm 21 is positioned to the rear of the objective 12.

Fig. 5 illustrates diagrammatically an apparatus, similar to the device diagrammatically illustrated by Fig. 1, for making enlargements of variable magnification.

When the enlarging ratio is to be changed, this may be accomplished by adjusting the objective 17 in axial direction. It is then also necessary to adjust the diaphragm 20 in accordance with the adjustment of the objective 17. Assuming that the diaphragm 21 is rigidly connected with the objective 17, these two elements 17 and 21 are mechanically connected with diaphragm 20 in such manner that upon adjustment of the objective 17 the diaphragm 20 is automatically shifted to a plane which is conjugate to the optical plane of diaphragm 21.

According to Fig. 5 a pair of toothed racks 30 meshing with a pinion 31 and connected fixedly with diaphragms 20 and objective 17 respectively may be used for this purpose. If desired the diaphragm 21 may also be positively coupled with the condenser lens system or another optical member.

The diaphragms 20ª, 21ª shown in Fig. 6 consist of symmetric sectors. Fig. 7 shows star diaphragms 20ᵇ, 21ᵇ. In order to adjust the proportion of the dispersed and directed forms of light these two diaphragms of Fig. 6 or Fig. 7 are rotated relatively to each other, for instance as indicated by the arrows, for instance when positioned as shown in Figs. 1 and 2.

Fig. 8 discloses a pair of grid diaphragms 20ᶜ, 21ᶜ which may either be rotatably adjusted relative to each other or may be laterally moved with respect to each other for the purpose of controlling the printing light.

Fig. 9 shows diagrammatically the combination of two central relatively adjustable sector diaphragms 20ª, 21ª with an adjustable iris diaphragm 25ª which surrounds one of the two central diaphragms to illustrate diaphragms for use with the systems illustrated in Figs. 3 and 4.

The above disclosed diaphragms are made of opaque material, however, it is also possible to make the same of some selective light absorbing material, for instance colored glass or colored Celluloid, so that only the photo chemically active light rays are influenced. This has the advantage that first the entire non-actinic rays of light may be used for focussing the picture on the printing material, and then the contrasts may be gradated by adjusting the diaphragms.

The diaphragms may also be made of bodies which influence the photo chemically active light physically. For instance polarizing filters or the like may be used which in known manner influence the intensity of the light rays when the filters are rotatably adjusted relatively to each other.

What I claim is:

1. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least one circular plate of opaque material provided with cut-outs therein which are arranged symmetrically around the center point of plate, said plate being arranged in the path of light in rear of the negative, and at least one more circular plate of opaque material provided with cut-outs therein which are shaped similarly to the solid opaque portions of the first named circular plate, said second circular plate being arranged in the path of light in front of the negative, said two circular plates being mounted in optical conjugated planes and being adapted to be rotatably adjusted in their respective planes relatively to each other about their center point for progressively varying the intensity proportion of the two mentioned types of light.

2. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least one circular plate of opaque material provided with cut-outs therein which are arranged symmetrically around the center point of plate, said plate being arranged in the path of light in rear of the negative, and at least one more circular plate of opaque material provided with cut-outs therein which are shaped similarly to the solid opaque portions of the first named circular plate, said second circular plate being arranged in the path of light in front of the negative, said two circular plates being mounted in optical conjugated planes and being adapted to be rotatably adjusted in their respective planes relatively to each other about their center point for progressively varying the intensity proportion of the two mentioned types of light, and means for simultaneously adjusting said circular plates along the optical axis of said device.

3. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least one circular plate of transparent material substantially impervious to actinic rays, provided with cut-outs therein which are arranged symmetrically around the center point of plate, said plate being arranged in the path of light in rear of the negative, and at least one more circular plate of transparent material substantially impervious to actinic rays, provided with cut-outs therein which are shaped similarly to the transparent portions of the first named circular plate, said second circular plate being arranged in the path of light in front of the negative, said two circular plates being mounted in optical conjugated planes and being adapted to be rotatably adjusted in their respective planes relatively to each other about their center point for progressively varying the intensity proportion of the two mentioned types of light.

4. In an enlarging and copying device, the combination, a source of light, a condenser lens system, means forming a support for a negative to be enlarged, a photographic enlarging objective, and means for varying in the beam of light passing through said objective the proportion of the intensity of light diffused by the negative to be printed to that which passes directly through said negative, said means including at least one circular plate of polarizing material provided with cut-outs therein which are arranged symmetrically around the center point of plate, said plate being arranged in the path of light in rear of the negative, and at least one more circular plate of polarizing material provided with cut-outs therein which are shaped similarly to the polarizing portions of the first named circular plate, said second circular plate being arranged in the path of light in front of the negative, said two circular plates being mounted in optical conjugated planes and being adapted to be rotatably adjusted in their respective planes relatively to each other about their center point for progressively varying the intensity proportion of the two mentioned types of light.

HANS SAUER.